Figure 4:
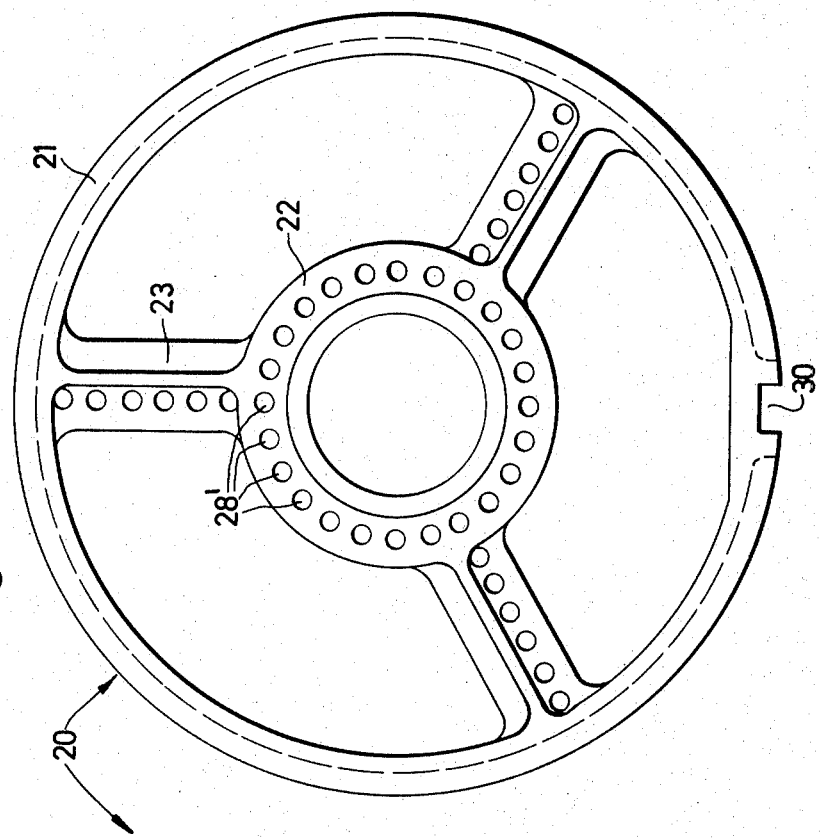

United States Patent [19]

Meyer et al.

[11] 3,797,376
[45] Mar. 19, 1974

[54] APPARATUS FOR COMMINUTING AND COOKING OF RAW MEAT USED FOR THE MANUFACTURE OF COOKED SAUSAGE

[75] Inventors: Gunter Meyer, Landau; Ludwig Grebe, Wallau/Lahn, both of Germany

[73] Assignee: Kramer & Grebe K.G., Maschinen-und Modellfabrik, Wallau/Lahn, Im Ruttert, Germany

[22] Filed: Sept. 3, 1971

[21] Appl. No.: 177,617

[30] Foreign Application Priority Data
Sept. 7, 1970  Germany.......................... 2044228

[52] U.S. Cl............... 99/353, 99/357, 99/475, 99/483, 99/484
[51] Int. Cl..... A23l 3/22, B02c 19/12, B02c 19/22, A47j 43/04
[58] Field of Search ............ 99/352, 353, 357, 426, 99/251, 259, 475, 483, 484; 17/40, 41; 21/98; 126/20

[56] References Cited
UNITED STATES PATENTS

| | | | |
|---|---|---|---|
| 2,200,786 | 5/1940 | Ardrey | 99/484 X |
| 235,343 | 12/1880 | Daniels | 99/475 X |
| 2,182,211 | 12/1939 | Paddock | 99/353 X |
| 2,693,348 | 11/1954 | Ellermann | 17/40 X |
| 1,881,171 | 10/1932 | Cooley | 99/352 X |
| 2,966,698 | 1/1961 | Thielen | 17/40 |
| 3,427,954 | 2/1969 | Long | 99/251 |
| 3,234,586 | 2/1966 | Smith | 17/41 X |
| 2,377,069 | 5/1945 | Brubaker | 17/40 X |
| 1,083,731 | 1/1914 | Darden | 99/251 |
| 1,796,677 | 3/1931 | Wilson | 17/40 |
| 1,844,346 | 2/1932 | Chapman | 99/352 |
| 2,324,202 | 7/1943 | Felton | 99/357 X |
| 3,050,771 | 8/1962 | Mylchreest | 99/358 X |
| 3,132,950 | 5/1964 | Macy | 99/358 X |
| 3,167,000 | 1/1965 | Sassen | 99/358 |

FOREIGN PATENTS OR APPLICATIONS

| | | | |
|---|---|---|---|
| 880,836 | 9/1971 | Canada | 99/483 |
| 845,009 | 7/1952 | Germany | 99/483 |

Primary Examiner—Wayne A. Morse, Jr.
Attorney, Agent, or Firm—Woodhams, Blanchard & Flynn

[57] ABSTRACT

Apparatus for the cooking of raw meat to be used in the manufacture of cooked sausage. Meat subdivided into chunks of convenient size is fed into a pressure creating conveyor, preferably a screw conveyor, and into a comminuting device consisting of cooperating perforated plates and rotating knives. Finely comminuted meat from same is then conveyed directly into a cooking housing. The cooking housing in a preferred embodiment consists of an elongated tubular member having steam jets spaced both axially and circumferentially therein. Conveying means are provided for carrying the meat through the cooking housing which means in a preferred embodiment are comprised of screw flights arranged on a common shaft which is rotated as a continuation of the shaft of the comminuting mechanism.

11 Claims, 7 Drawing Figures

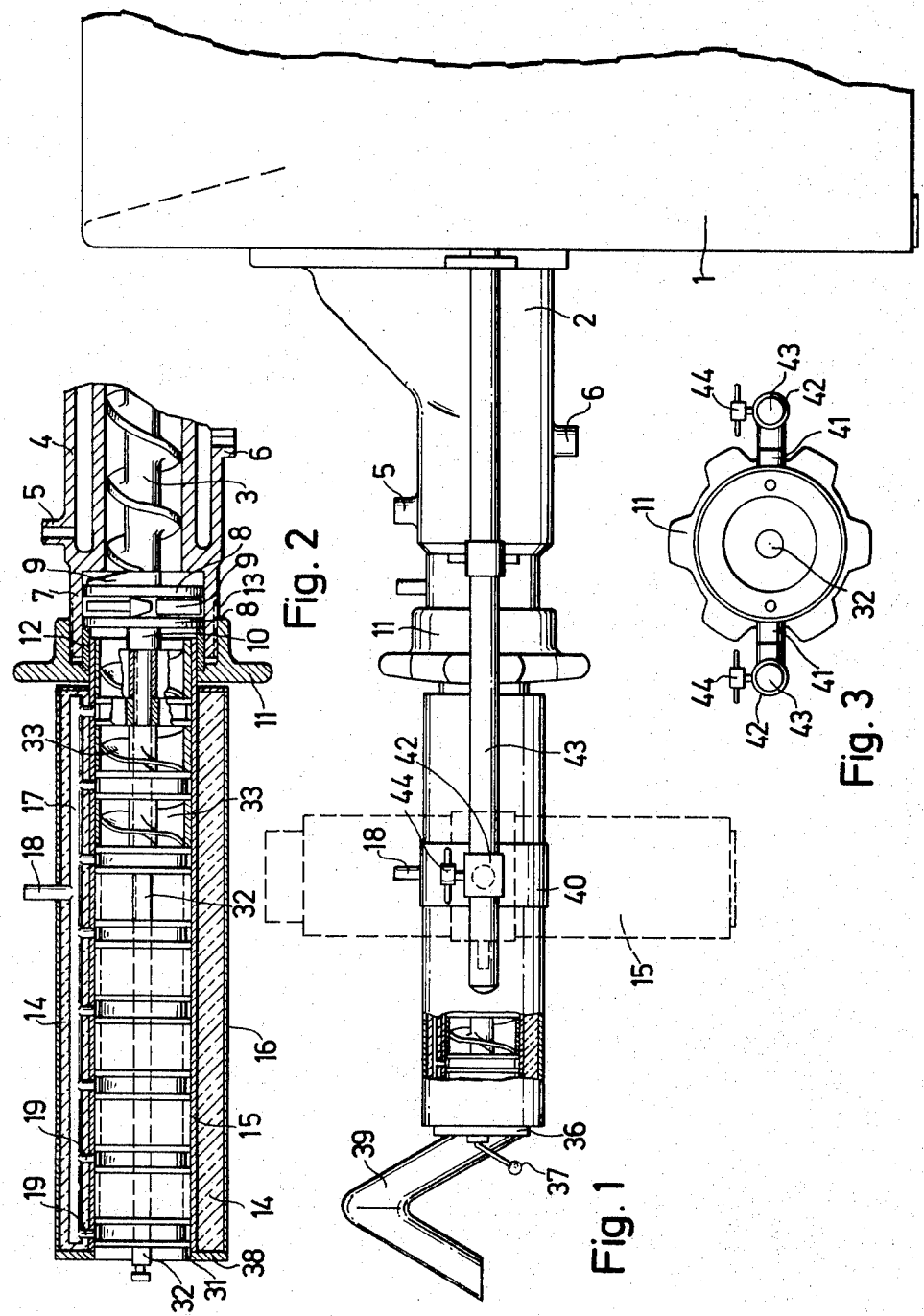

INVENTORS
GÜNTER MEYER
LUDWIG GREBE

APPARATUS FOR COMMINUTING AND COOKING OF RAW MEAT USED FOR THE MANUFACTURE OF COOKED SAUSAGE

The invention relates to an apparatus for the comminuting and cooking of raw meat to be used in the manufacture of cooked sausage, which invention avoids the disadvantages of the previously common apparatus for this purpose.

In the manufacture of cooked sausage it has been known to cook the selected meat in large pieces of various sizes in a boiler until even the largest pieces were cooked all of the way through. This has the disadvantage that the smaller pieces and the edge portions of the large pieces are cooked too long and are adversely affected in both nutritive value and taste. The cooked meat is then removed from the boiler by strainer spoons or other means, is placed into carts or into bowls, is transported to a mincing machine and is then comminuted by said mincing machine. The comminuted meat is moved from the mincing machine to a cutter and is worked to a mass with the usual additions, which mass is then filled into the sausage skin. This method has, aside from the already mentioned loss in the quality of the meat, the disadvantage that a boiler unit is required which necessarily results in undesireable vapors and an undesired additional heating of the work room. In removing the meat from the boiler broth, an additional loss of boiler broth occurs. The same is also true when the meat is moved from the boiler to the mincing machine and also as it is fed to the mincing machine. These disadvantages are avoided by the method of the invention.

According to the invention the comminuting and the cooking of the raw meat which is used to manufacture cooked sausage is accomplished in such a manner that the raw meat is comminuted in a mincing machine and is then conveyed through a tube and is supplied lengthwise of its course through the tube repeatedly with steam for heating. The feeding of steam for heating to the mass of meat which has been comminuted by the mincing machine and which has moved through the tube is carried out in the tube in the conveying direction of the meat in short intervals one after the other and at many points distributed over the cross section of the tube. Thus all comminuted meat particles are directly contacted by the steam for heating so that the cooking of the meat is accomplished during a very short time period, thus avoiding quality losses of the meat due to excessive cooking. A boiler unit is not needed, also transporting of the cooked meat to the mincing machine and the resultant loss of boiler broth are avoided.

An apparatus which is suitable for carrying out the method consists of a tube with several steam supply openings which are arranged spaced apart and of several steam distributing members inserted in said openings, each of said steam distributing members being connected to a steam source and having a larger number of nozzles which are distributed over the cross section of the tube and permit the steam to exit in the conveying direction of the meat. Screw flights are advantageously arranged between the steam supply members, which screw flights are driven by a common shaft. The tube is dimensioned in such a manner that it can be introduced into the housing head of a mincing machine. The said shaft can then be coupled directly with the knife shaft of the screw shaft of the mincing machine. The meat comminuted in the mincing machine thus reaches the tube directly. The meat is advantageously preheated in the mincing machine for which purpose the housing of the mincing machine is surrounded by a steam jacket.

Figure 5:
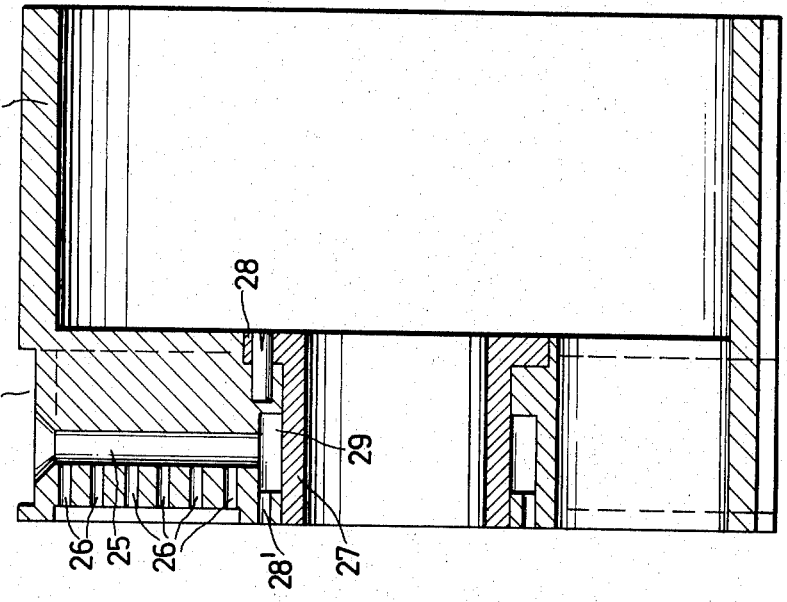
Figure 6:
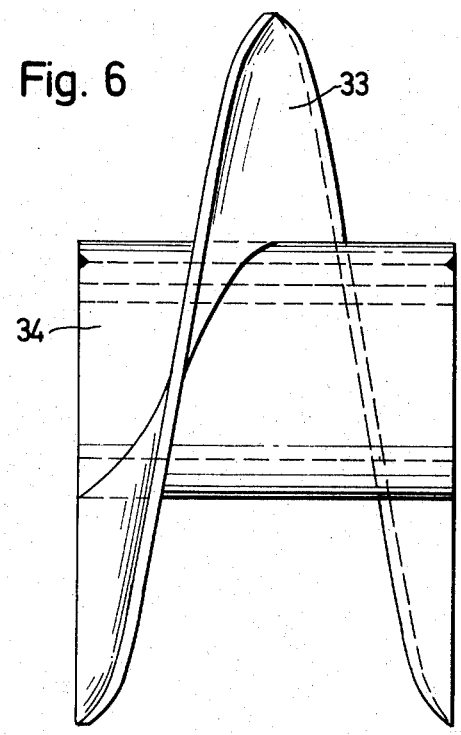
Figure 7:
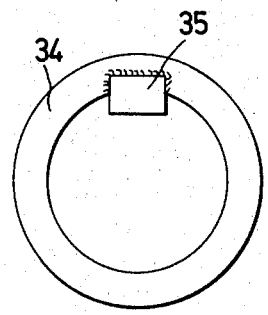

One exemplary embodiment of an apparatus for performing the method according to the invention is described hereinafter in connection with the drawings, in which:

FIG. 1 is a side view of the front part of a mincing machine with an apparatus according to the invention connected thereto, FIG. 2 is a longitudinal cross sectional view of the apparatus and the housing head of the mincing machine, FIG. 3 is a front view of the apparatus, FIG. 4 is a view of a steam-injecting or nozzle ring, FIG. 5 is a longitudinal cross sectional view of a ring according to FIG. 4, FIG. 6 is a view of a screw flight and FIG. 7 is a front view of the hub of the screw flight according to FIG. 6.

In FIG. 1, 1 identifies the front end of a mincing machine. A screw housing 2 is secured to said mincing machine in the usual manner. The housing receives a conveyer screw 3 and has a steam jacket 4 with a steam-inlet nozzle 5 and an outlet nozzle 6. The head 7 of the housing 2 receives a cutting device in a conventional manner. It consists of known perforated disks 8 and knives 9. The perforated disks are mounted fixed with respect to rotation in the housing head 7, the knives are mounted fixed with respect to rotation on the knife stub 10 of the screw 3. In order to adjust the blade pressure there is provided a nut 11 associated with a spacer ring 12. The nut is screwed onto an external thread 13 of the housing head 2.

The end of a tube 15 which is enclosed by a jacket 16 is positioned in the spacer ring 12. The annular chamber 14 between the tube 15 and the jacket 16 is filled with an insulating material. A pipe 17 with a pipe connection 18 for feeding of steam for heating is provided in the annular chamber 14. Individual short pieces of pipe 19 lead from the pipe 17 to coaxial openings in the tube 15. A larger number of steam-injecting or nozzle rings 20 are mounted axially movably but fixed with respect to rotation in the tube 15, which rings 20 are illustrated in FIGS. 4 and 5. Each nozzle ring consists of an external guide ring 21 and an internal nozzle ring 22. Both rings are connected by web members or bridges 23, in the exemplary embodiment three bridges. The outer ring 21 has an annular groove 23 into which one of the short pieces of pipe 19 ends. One radial opening 25 and several axially directed openings 26 which are used as outlet nozzles for the steam are mounted in each bridge 23. Each nozzle ring 20 receives a bearing hub 27 which is secured in the bridges 23 by a flange 28. The hub has an annular chamber 29 inside the ring 22. Nozzles 28' which lie alongside a ring are connected to said annular chamber. The steam is fed to the annular chamber 29 through the openings 25. Each nozzle ring has a groove 30 with which it is guided axially movably on a spring 31 in the tube 15 which prevents a rotation of the ring.

The bearing sleeves 27 of the individual nozzle rings receive a shaft 32. This shaft is coupled with the knife stub 10 of the screw 3. Screw flights 33 which are illustrated in FIGS. 6 and 7 are mounted fixed with respect to rotation on the shaft 32 between the nozzle rings 20. Each screw flight 33 has a hub 34 with a spline 35 which is axially movable in a longitudinal groove of the shaft 32, but connects the hub fixedly with respect to rotation to the shaft 32.

The tube 15 is at its forward end closed by a plate 36 which is secured in the front plate 38 of the chamber 14 by means of screws 37. A pipe 39 which is bent at an acute angle is secured to the plate 36. The mass of meat exits from the tube 15 through said pipe 39. The pipe creates a certain resistance against the exiting mass of meat, which at the same time prevents the free escape of the steam from the tube 15. A ring 40 surrounding the tube 15 is used to additionally secure same. Two diametrically positioned pins 41 are secured on said ring. A T-shaped short piece of pipe 42 is mounted rotatably on each pin. Said short pieces of pipe are positioned on rods 43 which are secured on both sides of the tube 15 on the mincing machine 1. Thus the rods 43 carry the tube 15. The position of the short pieces of pipe 42 on the rods 43 can be fixed by clamping screws 44. This type of securing makes the exchange of the cutting device of the mincing machine easy, one needs only to release the clamping screws 44 and can then pull the tube 15 forwardly sufficiently to release it from the nut 11. Then the tube 15 can be swung into the position illustrated in dashed lines in FIG. 1. The nut 11 becomes then accessible, it can be removed and the cutting insert can be taken out.

In operation raw meat is fed to the mincing machine. The screw 3 conveys the meat to the cutting device. The meat is preheated in the mincing machine by the steam which is fed to the steam chamber 4. This heating inside the screw is not always needed, it can also be replaced by increasing the number of nozzle rings 20.

The meat chopped by the knives reaches the tube 15 and is further transported by the first screw flight, namely, through the first nozzle ring, etc. Steam for heating is fed from each nozzle ring through the several nozzles to the mass of meat moving through the tube 15 so that the meat is cooked very quickly since practically each meat particle is contacted separately by the steam and excessive cooking is avoided. Thus the chopped meat leaves the tube 15 or the tube 39 cooked and can then be further processed to cooked sausage in the conventional manner.

The embodiments of the invention in which an exclusive property or privilege is claimed are defined as follows:

1. Apparatus for refining uncooked meat, comprising:
   means defining an elongated hollow tube having a plurality of steam input connections spaced axially along said hollow tube means;
   steam heat supply means and connecting means for connecting said heat supply means to said steam input connection, said steam heat being of a sufficient temperature to cook said meat;
   drive means for driving initially uncooked meat through said hollow tube means from an input end thereof whereat said meat is generally uncooked toward an output end thereof whereat said meat is cooked; and
   heat distribution means mounted internally of said hollow tube means and connected in circuit with said steam input connection and said heat supply means, said heat distribution means including a plurality of openings facing axially of said hollow tube means and spaced evenly around the cross section of the interior of said hollow tube means, said heat distribution being adapted to evenly distribute said steam heat from said heat supply means through said plurality axially facing openings directly into the cross section of said meat being transmitted through said hollow tube means by said drive means to thereby evenly cook said meat between said input and output ends of said hollow tube means, said heat distribution means comprising a plurality of nozzle ring means each being mounted in an axially spaced relation along the length of said hollow tube means and having said plurality of axially facing openings therein, said axially facing openings facing in the direction of said transmitted meat so that said steam heat is injected directly into the meat in the direction of meat movement through said hollow tube means.

2. Apparatus according to claim 1, wherein said nozzle ring means each are composed of an inner ring and an outer ring both concentric with said hollow tube means and a plurality of evenly distributed bridges connecting said inner ring to said outer ring, said outer ring having means defining an annular groove therein and defining at least part of said steam heat circuit, said inner ring and said bridges having means defining passageways therein defining at least another part of said steam heat circuit, said inner ring and said bridges having said axially facing openings therein communicating with said passageway means.

3. Apparatus according to claim 2, wherein said bridges extend radially between said inner ring and said outer ring.

4. Apparatus according to claim 1, wherein said drive means comprises a rotatably driven drive shaft extending longitudinally of said hollow tube means and a plurality of screw segments mounted on said drive shaft and fixed for rotation therewith while simultaneously being permitted to move axially of said drive shaft.

5. Apparatus according to claim 1, wherein said elongated hollow tube means comprises a pair of concentric inner and outer sleeves having a heat insulating material therebetween.

6. Apparatus according to claim 5, wherein said steam heat supply means comprises means defining a first passageway extending lengthwise of said sleeves in the spacing therebetween and defining a part of said steam heat circuit and wherein said steam input connections are composed of a plurality of axially spaced second passageways communicating with said first passageway means and opening inwardly to the interior of said inner sleeve, said nozzle ring means being aligned with said second passageway means to permit a supply of said steam heat to said axially facing openings.

7. Apparatus according to claim 1, including support means for supporting said tube means for pivotal movement about an axis transverse to the longitudinal axis of said tube means so that said input end can be moved away from the output section of a mincing machine.

8. Apparatus according to claim 7, wherein said support means comprises a pair of elongated rods extending parallel to said tube means on opposite sides thereof and are secured at one end to said mincing machine, said pivotal support being located adjacent the ends of said rods remote from said mincing machine.

9. Apparatus according to claim 1, wherein said output end of said hollow tube means includes a removable cover plate secured across said end and an inverted V-shaped outlet pipe secured to said cover plate so that the meat in said outlet pipe will prevent the free escape of steam from within said tube means out through said outlet pipe.

10. Apparatus according to claim 1, including means defining a mincing machine having a rotatable output screw and a jacket surrounding said screw, said jacket including means defining a chamber therein having an inlet connection thereto coupled to a source of steam and an outlet connection therefrom.

11. Apparatus according to claim 10, wherein said drive means drives said screw in said mincing machine.

* * * * *